(12) United States Patent
Hornung et al.

(10) Patent No.: US 12,141,055 B2
(45) Date of Patent: Nov. 12, 2024

(54) GLOBAL VIRTUAL ADDRESS SPACE ACROSS OPERATING SYSTEM DOMAINS

(71) Applicant: Micron Technology, Inc., Boise, ID (US)

(72) Inventors: Bryan Hornung, Plano, TX (US); Patrick Estep, Rowlett, TX (US)

(73) Assignee: Micron Technology, Inc., Boise, ID (US)

( * ) Notice: Subject to any disclaimer, the term of this patent is extended or adjusted under 35 U.S.C. 154(b) by 70 days.

(21) Appl. No.: 17/900,400

(22) Filed: Aug. 31, 2022

(65) Prior Publication Data
US 2023/0393970 A1  Dec. 7, 2023

Related U.S. Application Data

(60) Provisional application No. 63/348,079, filed on Jun. 2, 2022.

(51) Int. Cl.
*G06F 12/02* (2006.01)
*G06F 12/1027* (2016.01)

(52) U.S. Cl.
CPC ...... *G06F 12/0223* (2013.01); *G06F 12/1027* (2013.01); *G06F 2212/657* (2013.01)

(58) Field of Classification Search
CPC ............. G06F 12/0223; G06F 12/1027; G06F 2212/657
See application file for complete search history.

(56) References Cited

U.S. PATENT DOCUMENTS 8,347,063 B2 * 1/2013 Panesar ............... G06F 9/45558 718/1
2023/0176737 A1 * 6/2023 Han ........................ G06F 3/067

* cited by examiner

*Primary Examiner* — Gary W. Cygiel
(74) *Attorney, Agent, or Firm* — Schwegman Lundberg & Woessner, P.A.

(57) ABSTRACT

Disclosed in some examples, are methods, systems, devices, and machine-readable mediums which solve the above problems using a global shared region of memory that combines memory segments from multiple CXL devices. Each memory segment is a same size and naturally aligned in its own physical address space. The global shared region is contiguous and naturally aligned in the virtual address space. By organizing this global shared region in this manner, a series of three tables may be used to quickly translate a virtual address in the global shared region to a physical address. This prevents TLB thrashing and improves performance of the computing system.

18 Claims, 8 Drawing Sheets

GLOBAL VIRTUAL ADDRESS SPACE ACROSS OPERATING SYSTEM DOMAINS

PRIORITY APPLICATION

This application claims the benefit of priority to U.S. Provisional Application Ser. No. 63/348,079, filed Jun. 2, 2022, which is incorporated herein by reference in its entirety.

TECHNICAL FIELD

Embodiments pertain to memory sharing across computing devices. Some embodiments relate to a virtual addressing scheme for a global shared virtual address space across multiple operating system (OS) domains.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In some examples, non-volatile memory media may be used to build a system with a persistent memory model.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

Various protocols or standards can be applied to facilitate communication between a host and one or more other devices such as memory buffers, accelerators, or other input/output devices. In an example, an unordered protocol such as Compute Express Link (CXL) can be used to provide high-bandwidth and low-latency connectivity.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
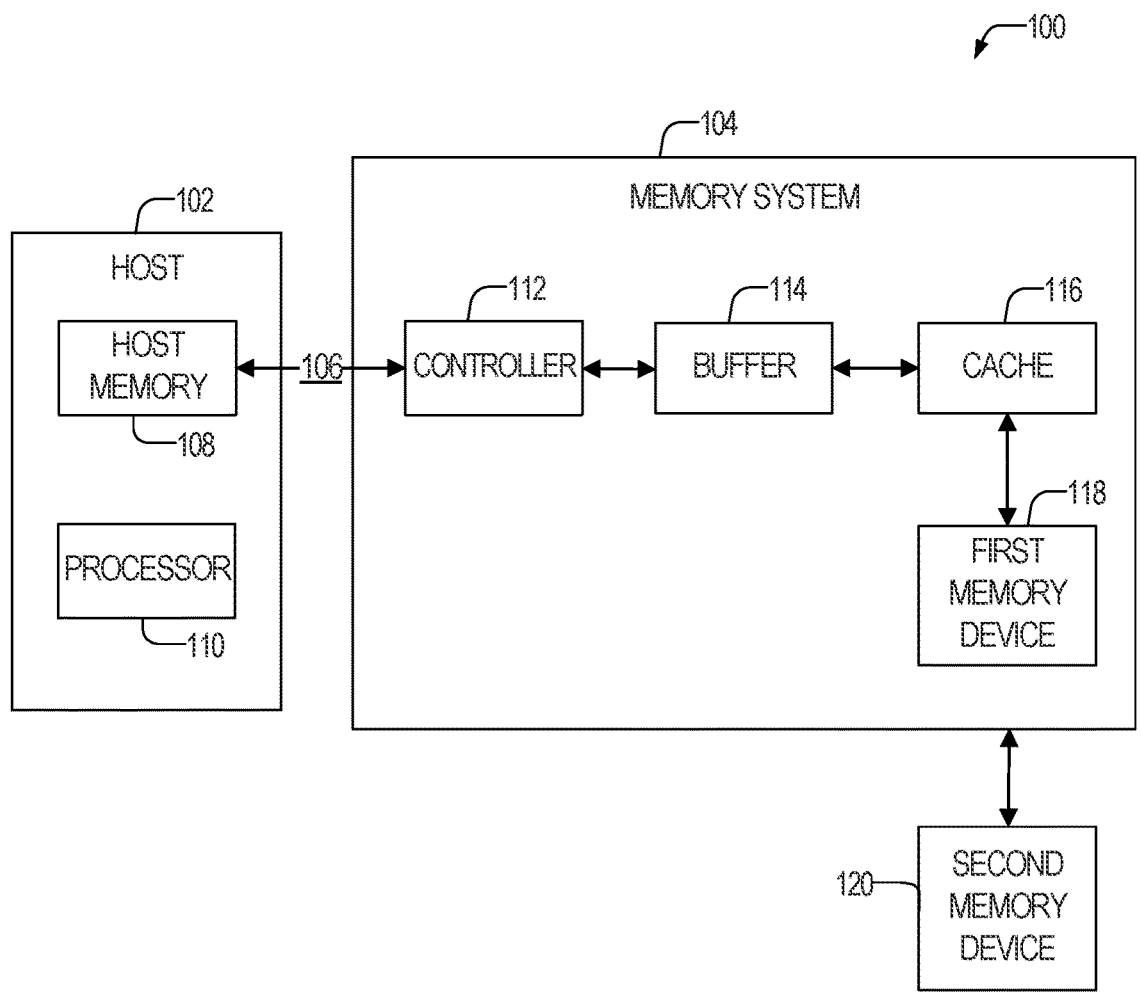
FIG. 1 illustrates generally a block diagram of an example of a computing system including a host device and a memory system according to some examples of the present disclosure.

Compute Express Link (CXL) is an open standard interconnect configured for high-bandwidth, low-latency connectivity between host devices and other devices such as accelerators, memory buffers, and smart I/O devices. CXL was designed to facilitate high-performance computational workloads by supporting heterogeneous processing and memory systems. CXL enables coherency and memory semantics on top of PCI Express (PCIe)-based I/O semantics for optimized performance.

In some examples, CXL is used in applications such as artificial intelligence, machine learning, analytics, cloud infrastructure, edge computing devices, communication systems, and elsewhere. Data processing in such applications can use various scalar, vector, matrix and spatial architectures that can be deployed in CPU, GPU, FPGA, smart NICs, and other accelerators that can be coupled using a CXL link.

CXL supports dynamic multiplexing using a set of protocols that includes input/output (CXL.io, based on PCIe), caching (CXL.cache), and memory (CXL.memory) semantics. In an example, CXL can be used to maintain a unified, coherent memory space between the CPU (e.g., a host device or host processor) and any memory on the attached CXL device. This configuration allows the CPU and other device to share resources and operate on the same memory region for higher performance, reduced data-movement, and reduced software stack complexity. In an example, the CPU is primarily responsible for maintaining or managing coherency in a CXL environment. Accordingly, CXL can be leveraged to help reduce device cost and complexity, as well as overhead traditionally associated with coherency across an I/O link.

CXL runs on PCIe PHY and provides full interoperability with PCIe. In an example, a CXL device starts link training in a PCIe Gen 1 Data Rate and negotiates CXL as its operating protocol (e.g., using the alternate protocol negotiation mechanism defined in the PCIe 5.0 specification) if its link partner is capable of supporting CXL. Devices and platforms can thus more readily adopt CXL by leveraging the PCIe infrastructure and without having to design and validate the PHY, channel, channel extension devices, or other upper layers of PCIe.

In an example, CXL supports single-level switching to enable fan-out to multiple devices. This enables multiple devices in a platform to migrate to CXL, while maintaining backward compatibility and the low-latency characteristics of CXL.

In an example, CXL can provide a standardized compute fabric that supports pooling of multiple logical devices (MLD) and single logical devices such as using a CXL switch connected to several host devices or nodes (e.g., Root Ports). This feature enables servers to pool resources such as accelerators and/or memory that can be assigned according to workload. For example, CXL can help facilitate resource allocation or dedication and release. In an example, CXL can help allocate and deallocate memory to various host devices according to need. This flexibility helps designers avoid over-provisioning while ensuring best performance.

Some of the compute-intensive applications and operations mentioned herein can require or use large data sets. Memory devices that store such data sets can be configured for low latency and high bandwidth and persistence. One problem of a load-store interconnect architecture includes guaranteeing persistence. CXL can help address the problem using an architected flow and standard memory management interface for software, such as can enable movement of persistent memory from a controller-based approach to direct memory management.

CXL devices may feature computational capabilities where a CXL device may have both memory and compute resources. These CXL devices may be termed "compute-near-memory" devices and systems featuring these devices may be termed compute-near-memory systems. This term reflects the fact that computational resources are moved physically nearer to the memory it is using as compared to traditional computer architectures. This arrangement reduces data movement and the associated costs and penalties of that data movement such as increased latency. Many of these compute-near-memory devices may be interconnected to each other on a single host. Multiple hosts may also be connected to each other using one or more switches. Together, the interconnected system may feature a network of compute and memory capabilities. A task or process executing on the system may spawn threads or work units that execute across multiple compute units to expedite the task. In these examples, it may be beneficial to have shared memory across one or more of the CXL devices that are accessible by all the threads or work units. In other examples, it may be beneficial to allow two different threads of two different processes to utilize a shared memory space to allow for inter-process communication.

In a traditional architecture, memory accesses typically are made by a thread using a virtual address that is then mapped to a physical address. The access may then be routed to a correct memory location and serviced by the memory serviced by that thread. The mapping between virtual addresses and physical addresses provides a contiguous virtual memory region for the process that may be spread out amongst non-contiguous physical resources. This makes memory allocation and deallocation easier for the Operating System (OS). The virtual to physical translation typically uses a translation table that maps each virtual address to a corresponding physical address. To speed up this process, a translation table cache—or Translation Look-Aside Buffer (TLB) caches the most recently used virtual-to-physical memory mappings to avoid having to load additional translations from slower memory or storage. While the TLB is faster, it can only store a portion of the logical to physical mapping table.

As noted, in some instances, a global shared region of memory across a plurality of compute-near-memory devices may be desirable. To provide for this, a global shared virtual address space may be defined that is referenced by all the processes utilizing this pool using a same virtual address space across all processes. That is, a same virtual address issued from any process in any OS domain using the shared global memory region will access the same physical memory location. Traditional translation techniques may not be sufficient to handle the sheer scale of some CXL implementations that may make terabytes or petabytes of memory available to one or more processes in such a shared scheme. In these large systems, using a traditional 4 k page size of an x86 system may result in billions of potential table entries. Unless the system executes a particularly well-behaved process that accesses a small amount of memory repeatedly, accesses pages such that the process spends a large amount of time accessing a same page, or the system allocates a significant amount of memory to increase the size of the TLB, the performance will be poor because the TLB will likely thrash repeatedly as TLB misses will heavily outnumber TLB hits.

Disclosed in some examples, are methods, systems, devices, and machine-readable mediums which solve the above problems using a global shared region of memory that combines memory segments from multiple CXL devices. Each memory segment is a same size and naturally aligned in its own physical address space. The global shared region is contiguous and naturally aligned in the virtual address space. By organizing this global shared region in this manner, a series of three tables may be used to quickly translate a virtual address in the global shared region to a physical address. This prevents TLB thrashing and improves performance of the computing system.

FIG. 1 illustrates generally a block diagram of an example of a computing system 100 including a host device 102 and a memory system 104. The host device 102 includes a central processing unit (CPU) or processor 110 and a host memory 108. In an example, the host device 102 can include a host system such as a server computer, workstation, personal laptop computer, a desktop computer, a digital camera, a smart phone, a memory card reader, and/or Internet-of-thing enabled device, among various other types of hosts, and can include a memory access device, e.g., the processor 110. The processor 110 can include one or more processor cores, a system of parallel processors, or other CPU arrangement.

The memory system 104 includes a controller 112, a buffer 114, a cache 116, and a first memory device 118. The first memory device 118 can include, for example, one or more memory modules (e.g., single in-line memory modules, dual in-line memory modules, etc.). The first memory device 118 can include volatile memory and/or non-volatile memory, and can include a multiple-chip device that comprises one or multiple different memory types or modules. In an example, the computing system 100 includes a second memory device 120 that interfaces with the memory system 104 and the host device 102.

The host device 102 can include a system backplane and can include a number of processing resources (e.g., one or more processors, microprocessors, or some other type of controlling circuitry). The computing system 100 can optionally include separate integrated circuits for the host device 102, the memory system 104, the controller 112, the buffer 114, the cache 116, the first memory device 118, the second memory device 120, any one or more of which may comprise respective chiplets that can be connected and used together. In an example, the computing system 100 includes a server system and/or a high-performance computing (HPC) system and/or a portion thereof. Although the example shown in FIG. 1 illustrates a system having a Von Neumann architecture, embodiments of the present disclosure can be implemented in non-Von Neumann architectures, which may not include one or more components (e.g., CPU, ALU, etc.) often associated with a Von Neumann architecture.

In an example, the first memory device 118 can provide a main memory for the computing system 100, or the first memory device 118 can comprise accessory memory or storage for use by the computing system 100. In an example, the first memory device 118 or the second memory device 120 includes one or more arrays of memory cells, e.g., volatile and/or non-volatile memory cells. The arrays can be flash arrays with a NAND architecture, for example. Embodiments are not limited to a particular type of memory device. For instance, the memory devices can include RAM, ROM, DRAM, SDRAM, PCRAM, RRAM, and flash memory, among others.

In embodiments in which the first memory device 118 includes persistent or non-volatile memory, the first memory device 118 can include a flash memory device such as a NAND or NOR flash memory device. The first memory device 118 can include other non-volatile memory devices such as non-volatile random-access memory devices (e.g., NVRAM, ReRAM, FeRAM, MRAM, PCM), "emerging" memory devices such as a ferroelectric RAM device that includes ferroelectric capacitors that can exhibit hysteresis characteristics, a 3-D Crosspoint (3D XP) memory device, etc., or combinations thereof.

In an example, the controller 112 comprises a media controller such as a non-volatile memory express (NVMe) controller. The controller 112 can be configured to perform operations such as copy, write, read, error correct, etc. for the first memory device 118. In an example, the controller 112 can include purpose-built circuitry and/or instructions to perform various operations. That is, in some embodiments, the controller 112 can include circuitry and/or can be configured to perform instructions to control movement of data and/or addresses associated with data such as among the buffer 114, the cache 116, and/or the first memory device 118 or the second memory device 120.

In an example, at least one of the processor 110 and the controller 112 comprises a command manager (CM) for the memory system 104. The CM can receive, such as from the host device 102, a read command for a particular logic row address in the first memory device 118 or the second memory device 120. In some examples, the CM can determine that the logical row address is associated with a first row based at least in part on a pointer stored in a register of the controller 112. In an example, the CM can receive, from the host device 102, a write command for a logical row address, and the write command can be associated with second data. In some examples, the CM can be configured to issue, to non-volatile memory and between issuing the read command and the write command, an access command associated with the first memory device 118 or the second memory device 120. In some examples, the CM can issue, to the non-volatile memory and between issuing the read command and the write command, an access command associated with the first memory device 118 or the second memory device 120.

In an example, the buffer 114 comprises a data buffer circuit that includes a region of a physical memory used to temporarily store data, for example, while the data is moved from one place to another. The buffer 114 can include a first-in, first-out (FIFO) buffer in which the oldest (e.g., the first-in) data is processed first. In some embodiments, the buffer 114 includes a hardware shift register, a circular buffer, or a list.

In an example, the cache 116 comprises a region of a physical memory used to temporarily store particular data that is likely to be used again. The cache 116 can include a pool of data entries. In some examples, the cache 116 can be configured to operate according to a write-back policy in which data is written to the cache without the being concurrently written to the first memory device 118. Accordingly, in some embodiments, data written to the cache 116 may not have a corresponding data entry in the first memory device 118.

In an example, the controller 112 can receive write requests involving the cache 116 and cause data associated with each of the write requests to be written to the cache 116. The controller 112 can similarly receive read requests and cause data stored in, e.g., the first memory device 118 or the second memory device 120, to be retrieved and written to, for example, the host device 102 via the interface 106.

In an example, the interface 106 can include any type of communication path, bus, or the like that allows for information to be transferred between the host device 102 and the memory system 104. Non-limiting examples of interfaces can include a peripheral component interconnect (PCI) interface, a peripheral component interconnect express (PCIe) interface, a serial advanced technology attachment (SATA) interface, a Universal Serial Bus (USB) interface, a Thunderbolt interface, and/or a miniature serial advanced technology attachment (mSATA) interface, among others. In an example, the interface 106 includes a PCIe 5.0 interface that is compliant with the compute express link (CXL) protocol standard. Accordingly, in some embodiments, the interface 106 supports transfer speeds of at least 32 GT/s.

As similarly described elsewhere herein, CXL is a high-speed central processing unit (CPU)-to-device and CPU-to-memory interconnect designed to enhance compute performance. CXL technology maintains memory coherency between the CPU memory space (e.g., the host memory 108) and memory on attached devices or accelerators (e.g., the first memory device 118 or the second memory device 120), which allows resource sharing for higher performance, reduced software stack complexity, and lower overall system cost. CXL is designed to be an industry open standard interface for high-speed communications as accelerators are increasingly used to complement CPUs in support of emerging data-rich and compute-intensive applications such as artificial intelligence and machine learning.

Figure 2:
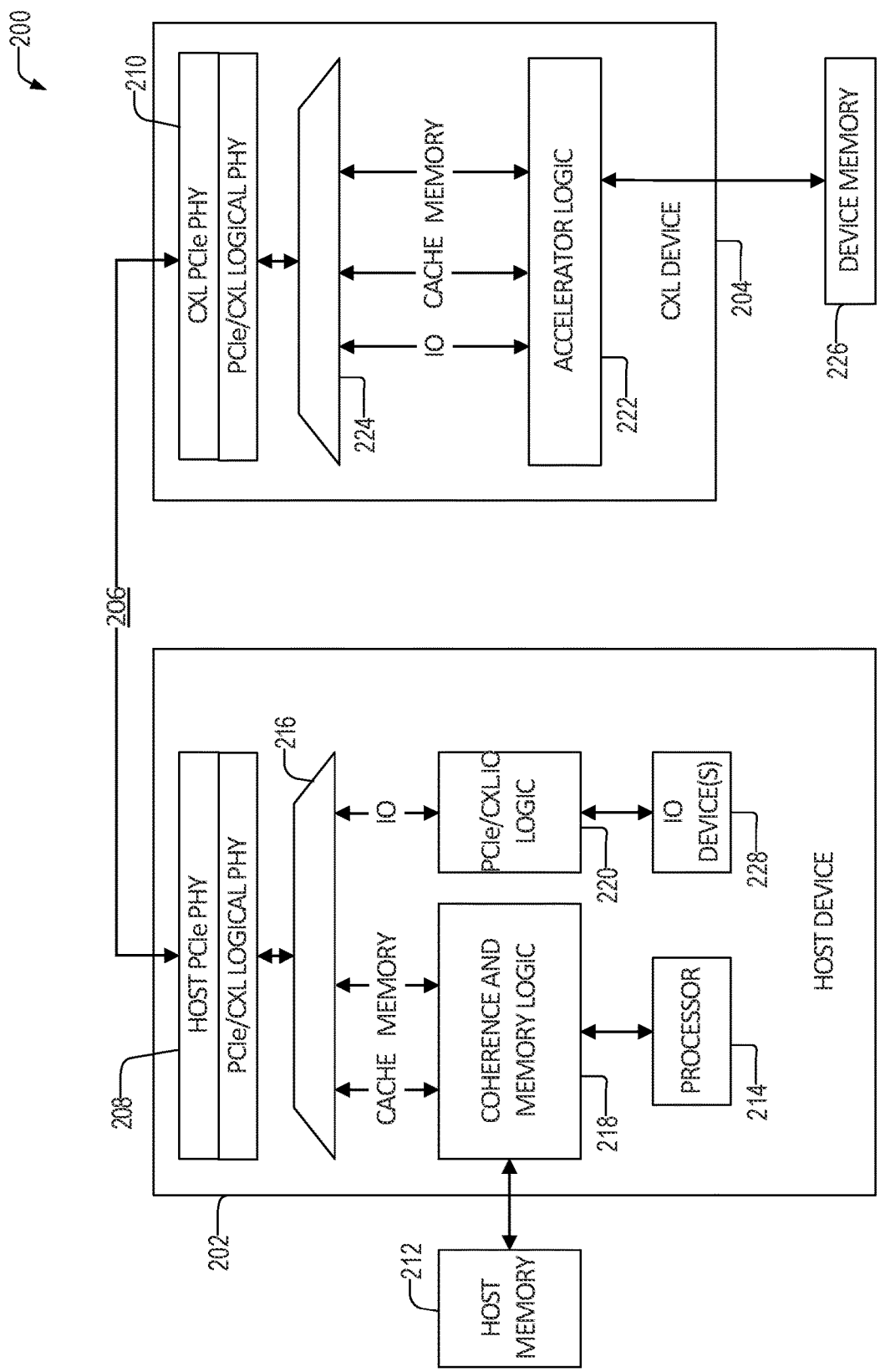
FIG. 2 illustrates generally an example of a CXL system that uses a CXL link to connect a host device and a CXL device.

FIG. 2 illustrates generally an example of a CXL system 200 that uses a CXL link 206 to connect a host device 202 and a CXL device 204. In an example, the host device 202 comprises or corresponds to the host device 102 and the CXL device 204 comprises or corresponds to the memory system 104 from the example of the computing system 100 in FIG. 1. A memory system command manager can comprise a portion of the host device 202 or the CXL device 204. In an example, the CXL link 206 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL.cache can enable a device to cache data from the host memory (e.g., from the host memory 212) using a request and response protocol. CXL.memory can enable the host device 202 to use memory attached to the CXL device 204, for example, in or using a virtualized memory space. In an example, CXL.memory transactions can be memory load and store operations that run downstream from or outside of the host device 202.

In the example of FIG. 2, the host device 202 includes a host processor 214 (e.g., comprising one or more CPUs or cores) and IO device(s) 228. The host device 202 can comprise, or can be coupled to, host memory 212. The host device 202 can include various circuitry or logic configured to facilitate CXL-based communications and transactions with the CXL device 204. For example, the host device 202 can include coherence and memory logic 218 configured to implement transactions according to CXL.cache and CXL.mem semantics, and the host device 202 can include PCIe logic 220 configured to implement transactions according to CXL.io semantics. In an example, the host device 202 can be configured to manage coherency of data cached at the CXL device 204 using, e.g., its coherence and memory logic 218.

The host device 202 can further include a host multiplexer 216 configured to modulate communications over the CXL link 206 (e.g., using the PCIe PHY and logical PHY layers 208). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures may use different solutions, which in turn can compromise backward compatibility. CXL can address this problem by consolidating the coherency function at the host device 202, such as using the coherence and memory logic 218.

The CXL device 204 can include an accelerator device that comprises various accelerator logic 222. In an example, the CXL device 204 can comprise, or can be coupled to, CXL device memory 226. The CXL device 204 can include various circuitry or logic configured to facilitate CXL-based communications and transactions with the host device 202 using the CXL link 206. For example, the accelerator logic 222 can be configured to implement transactions according to CXL.cache, CXL.mem, and CXL.io semantics. The CXL device 204 can include a CXL device multiplexer 224 configured to control communications over the CXL link 206 using the CXL PCIe PHY and Logical PHY layers 210. The accelerator logic 222 may be one or more processors that may perform one or more tasks. Accelerator logic 222 may be a general purpose processor or a processor designed to accelerate one or more specific workloads.

Figure 3:
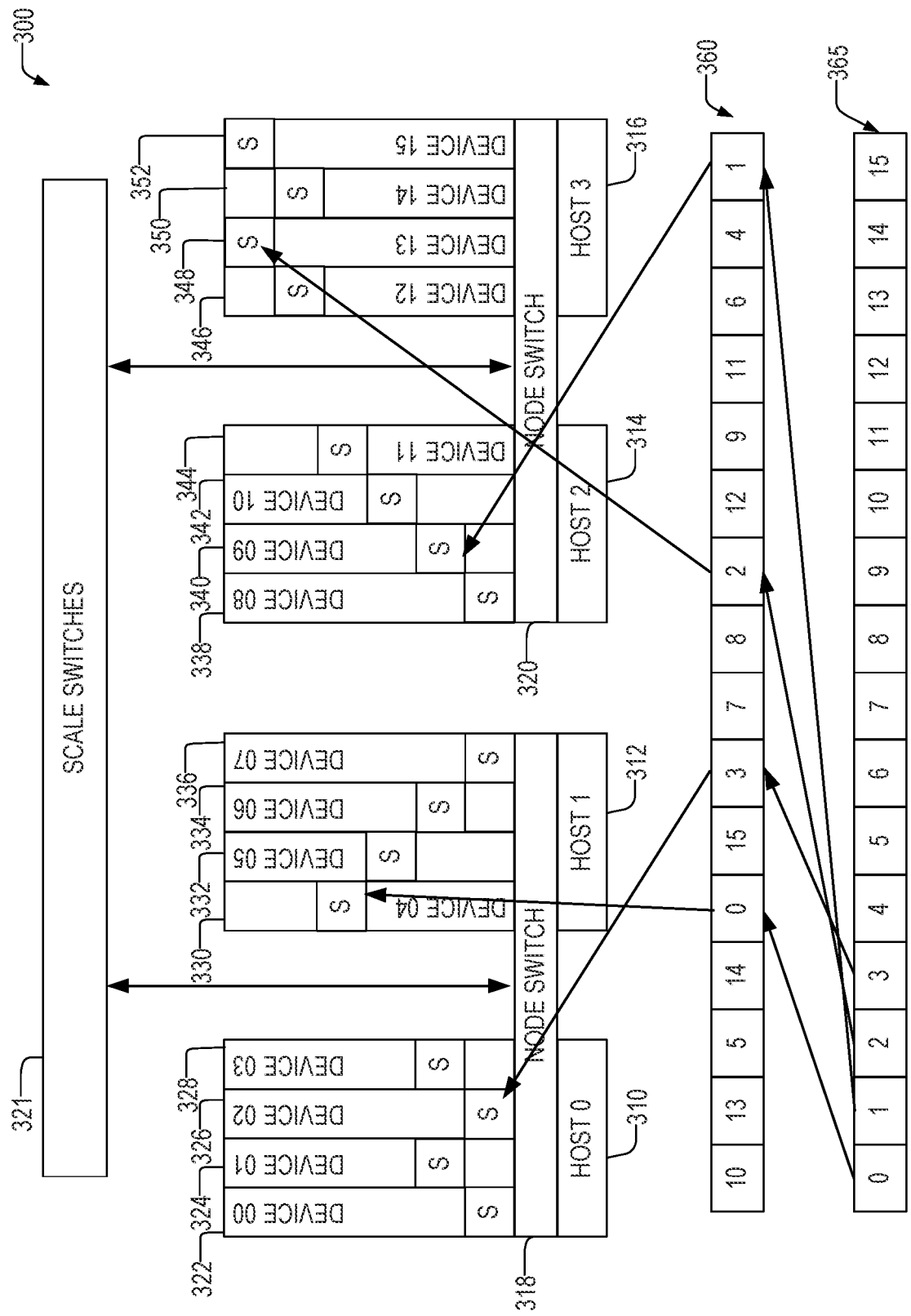
FIG. 3 illustrates a system with multiple hosts, each with multiple CXL devices according to some examples of the present disclosure.

FIG. 3 illustrates a system 300 with multiple hosts, each with multiple CXL devices according to some examples of the present disclosure. Host devices 310, 312, 314, and 316 may have multiple CXL devices each such as CXL devices 322-352, as shown. Host device 310 may be connected to host device 312 using a node switch 318. Likewise, host device 314 and host device 316 may be connected using a node switch 320. Node switch 318 and 320 may be interconnected using one or more scale switches 321. In some examples, each CXL device 322-352 may be defined by a device ID, for example device 324 may be assigned device ID 01. In some examples, each device may have both a physical device ID and a virtual device ID to support virtualization of devices (e.g., for failover in high-availability applications). The node switches 318, 320, and scale switches 321 may route CXL requests between hosts and devices based upon, in part, the virtual and physical device ID.

As previously described, an efficient virtual shared global memory region may be used to allow processes from different OS domains to cooperate on a distributed application. An OS domain is a group of one or more host devices controlled by a same OS instance. For example, each host device may be a separate OS domain. The same virtual address issued from any process in any OS domain using the shared global memory region will access the same physical memory location. The physical memory location so accessed may be on a same device as the process that is accessing it, or on a different device. A virtual shared global memory region is defined by grouping the same power-of-two memory region size on N devices (e.g., CXL devices 322-352). The log base two of N bits above the region's address offset bits is used to identify a virtual device ID of the device where the physical memory is located. Similarly, a physical shared global memory region is defined by grouping the same power-of-two memory region size on N devices. The log base two of N bits above the region's address offset bits is used as a physical device ID.

FIG. 3 illustrates a global virtual region that is made up of 16 segments in the virtual address space 365 that are then mapped to physical addresses in the global physical address space 360 that are physically located across multiple hosts and devices. Physical memory locations mapped to the global physical address space 360 are labelled with an "S" in the Figure. In some examples, multiple applications executing on one or more of the devices and/or hosts may utilize this global shared space, but in other examples only certain processes may be provided access. For example, cooperating processes may be granted access and uncooperating processes may not be granted access. An example of cooperating processes may include different threads of a same application.

While FIG. 3 illustrates an example in which a single block is allocated to each device, in other examples, multiple blocks may be assigned to a single device. When both virtual address blocks and physical address blocks are composed of naturally aligned power-of-two sized memory, a simple set of tables can be used to translate the virtual address to the physical address. These same translations may be used in the OS domain page tables to enable the access of this region from processing elements that do not use the simple tables.

Figure 4:
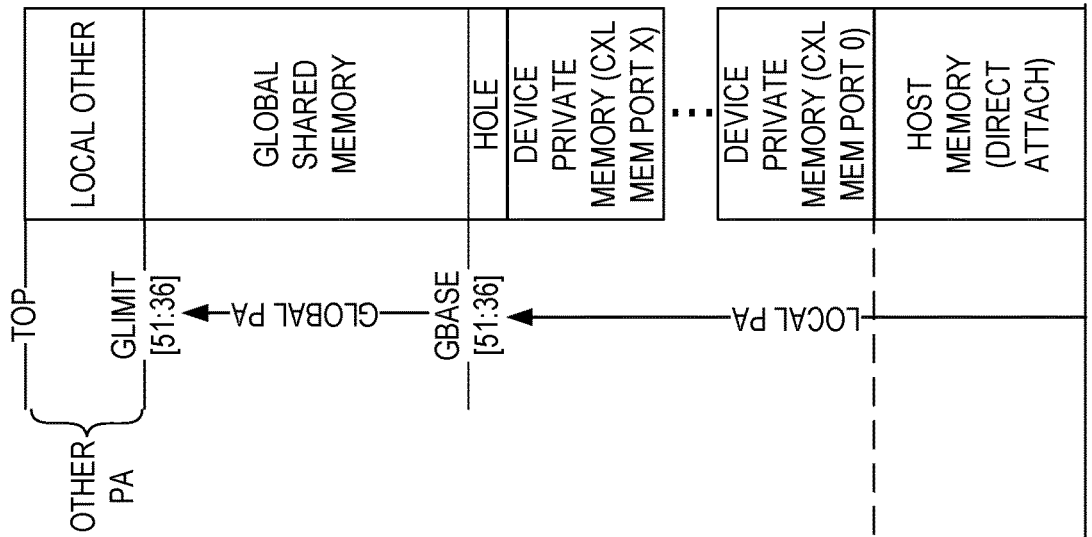
FIG. 4 illustrates memory maps for two different CXL devices showing a disparate placement of the device shared memory according to some examples of the present disclosure.
Figure 4:
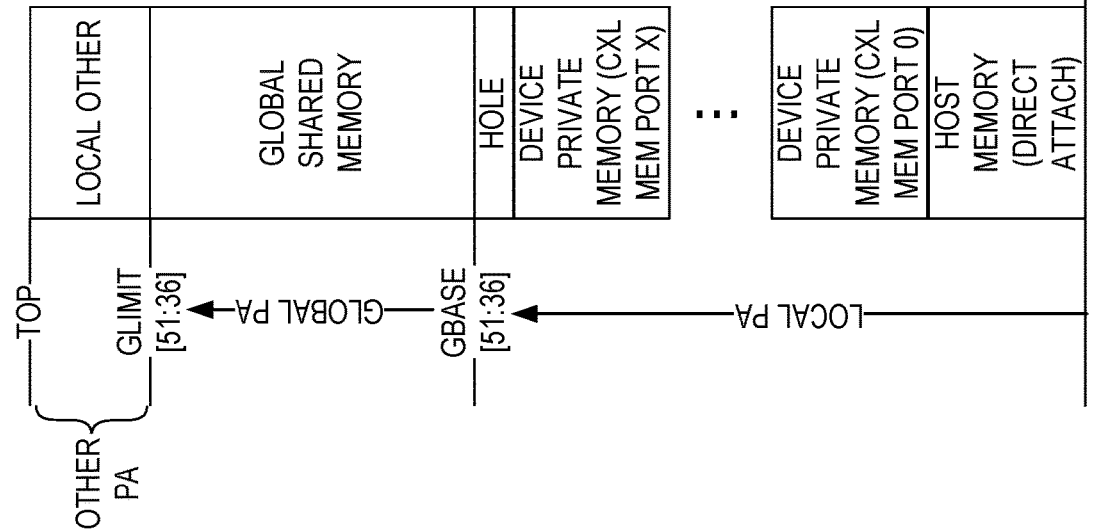

FIG. 4 illustrates memory maps for two different CXL devices showing a disparate placement of the device shared memory according to some examples of the present disclosure. First device, device A 405, includes a section of direct attached host memory, device private memory, a memory hole where nothing is allocated, global shared memory (CXL memory) and other local memory. Second device, device B 410 includes the same allocations, but the direct attached host memory is larger, which pushes the global shared memory to higher address ranges. FIG. 4 illustrates that although each node can have different starting offsets for the globally shared memory region, a mechanism may be used to map the physical segment number to a device, such that all OS domains can access a specific memory location. In some examples, a simpler mechanism may force the globally shared memory region to start at the same offset of all nodes.

An application wishing to address the global shared memory may issue a memory command (load, store, and the like) by providing a global shared virtual memory address as part of the command. Logic within the CXL device, the host, or a switch may transform the virtual memory address to a physical address. The translation from a virtual address to a physical address may occur in two steps. First, a memory management unit (MMU) associated with a device determines if the virtual address maps to an address in the global shared region and if so, whether it maps to a local segment or a remote segment. Second, if the address maps to a local segment, the MMU maps the virtual address to a local physical address; if it maps to a remote segment, the request is forwarded to a scaling interface egress block which determines which remote device hosts the targeted segment. From there the request is forwarded to the device where the physical memory is located.

As noted, the virtual address includes an encoded virtual device ID value. The MMUs first need to determine if the virtual device ID value of the virtual address under translation maps to the local device or a remote device. This mapping is accomplished by extracting the virtual device identification (VDID) field from the virtual address and comparing it to the VDID assigned to the device making the memory request. A request to a virtual address that is hosted by the local device is converted to a physical address by replacing the VDID with a local physical ID and the virtual segment number with a physical segment number.

Figure 5:
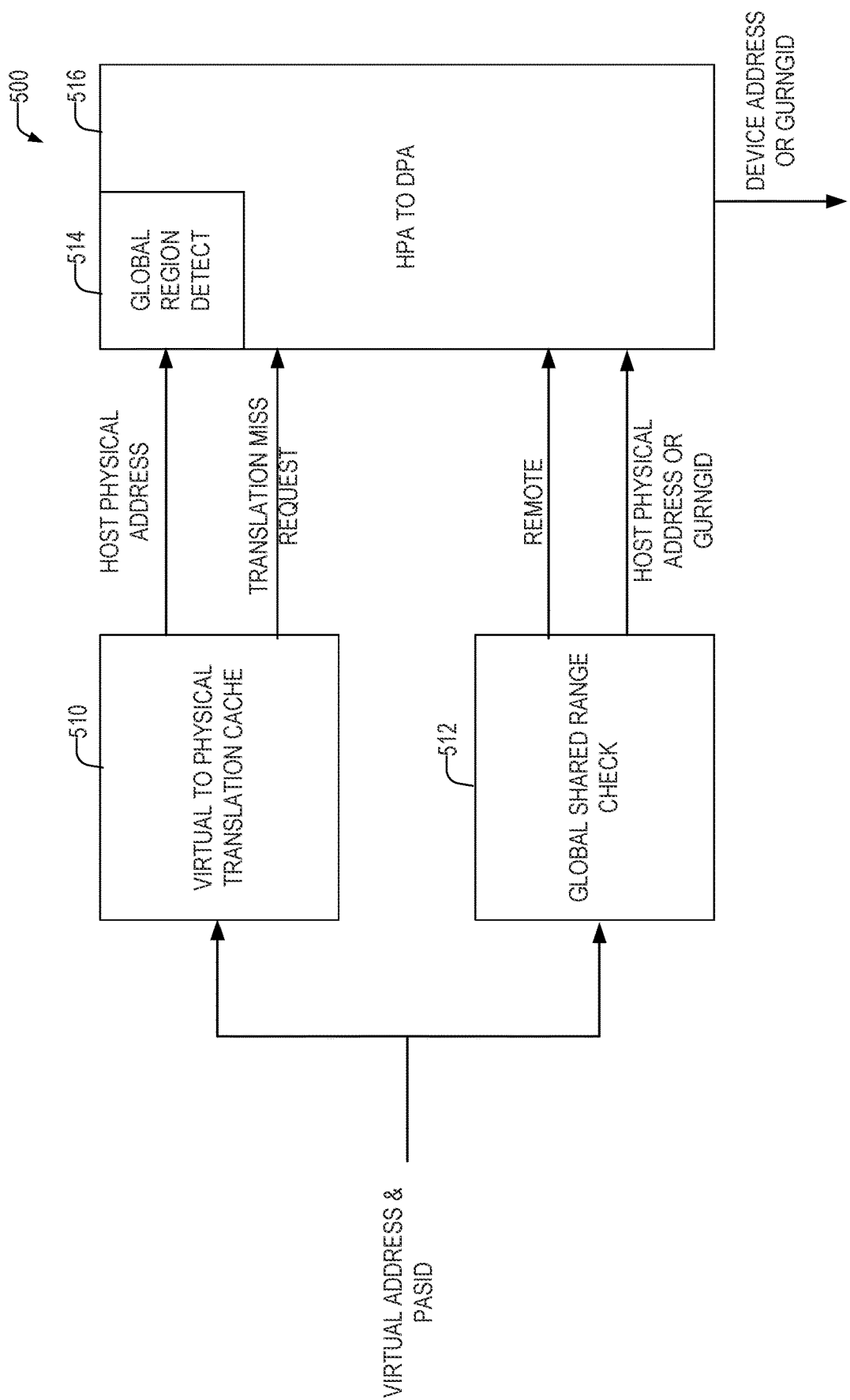
FIG. 5 illustrates an example diagram of a first portion of a virtual to physical translation is shown according to some examples of the present disclosure.

FIG. 5 illustrates an example diagram of a first portion of a virtual to physical translation logic 500 according to some examples of the present disclosure. The virtual address of the memory request and the CXL process address ID (PASID) of the requestor is passed to the virtual-to-physical translation logic 500 shown in FIG. 5. The global shared range check component 512 determines, based upon the virtual address, if the virtual address is part of the global virtual address space. In some examples, the virtual address is also processed, in parallel, by the traditional virtual-to-physical translation cache component 510 (e.g., a TLB). This is because, until the global shared range check component 512 completes its analysis, it is not yet known if the virtual address is part of the global virtual address space or whether it is a private virtual address for the device. By processing the virtual address as both a potential global shared range and a potential local private address in parallel, the system does not incur a performance penalty by checking one first. In other examples, the virtual to physical translation cache component 510 check may be performed only if the global shared range check indicates that the virtual address is not part of the global virtual shared region.

The virtual to physical translation cache check component 510 may either indicate that the address is not in the cache or, if the address is in the cache, the host physical address. On the other hand, if the virtual address is within the global shared virtual address space, the global shared range check component 512 may output an indication that the address is remote or local and if its local, a host physical address, and if its remote, a global unique region identifier (GURGNID). In some examples, the virtual to physical translation cache component 510 does not store translations for the global virtual physical address space. In cases in which the virtual address maps to a global virtual address space, the virtual to physical translation cache component 510 will have a cache miss and the HPA to DPA component 516 and global region detect component 514 will not evict any entries in the virtual to physical translation cache component 510. This is to prevent the previously discussed thrashing issues.

In some examples, the global shared range check component 512 may utilize a table or other data structure with an entry for each global shared virtual region. As one example, the table may include one or more of the following fields:

| Register | Bits | Field | Description |
| --- | --- | --- | --- |
| Region_Base | 29:0 | Reserved | Reserved. Set to Zero. Regions start at a minimum of 1 Gigabyte addresses |
| | 66:29 | Address | Memory base low. Regions start at a naturally aligned multiple of the interleave size. |
| | 72:67 | Reserved | |
| | 73 | Valid | Flag to indicate whether this global shared region is valid |
| Region_Size | 29:0 | Reserved | Reserved (set to zero) |
| | 66:20 | Size | Memory region size. In some examples, the size must be a multiple of the interleave way size. |
| | 73:67 | Reserved | |
| Local_VID | 5:0 | Shift | Number of bits to shift the address to move the Device_VID to bit 0 |
| | 15:6 | Reserved | |
| | 27:16 | Mask | Mask to determine which address bits to use for the local VID check |
| | 31:28 | Reserved | |
| | 43:32 | Local VID | The value of the local VID |
| | 47:44 | Reserved | |
| | 53:48 | GURGNID | The globally unique range ID used to access the proper Egress Device ID mapping structure and to access the correct region of the remote ingress MMU. |
| | 62:54 | Reserved | |
| | 63 | Valid | If set, the local device supplies memory to this global shared region. |
| Local_HPA | 5:0 | SizeW | Region segment size width. In some examples, valid values are between 20 (1 MiByte) and 40 (1 TiB). |
| | 19:6 | Reserved | Reserved Set to Zero |
| | 51:20 | Physical Page Address | Either the physical page address or an address to offset extracted from the virtual address to generate a local physical address. Physical device ID bits should be zero. |
| | 55:52 | Reserved | |
| | 56 | R | Processor has read permission for the region |
| | 57 | W | Processor has write permission for the region |
| | 58 | X | Processor has execute permission for the region. |
| | 63:59 | Reserved | |

The global shared range check logic 512 may iterate through all entries of the table to determine if a record exists where the virtual address is between the memory base low and the memory base low+size fields to determine whether the virtual address is between the base and the base+size. If the virtual memory address is not an address between the base and the base+size, then a next record is checked in the table for a next shared virtual pool. If no records match, then the address is local, and no further action is taken. If, however, the virtual memory address is between the base and the base+size of a particular record, then the global shared range check logic 512 extracts the Device VID from the virtual address by bit shifting the virtual address by the shift field of the particular record and then applying the mask field of the particular record. The global shared range check logic 512 then compares the resulting VID to the Local_VID field of the particular record. If the VID matches the Local_VID field, then the global shared memory referenced by the virtual address is local to the device and the physical address is given as the Physical Page Address. If the VID does not match the Local_VID field, then the GURGNID of the particular record is extracted and sent to the HPA to DPA component 516.

The HPA to DPA 516 component converts a CXL host physical address (HPA) to a CXL device physical address (DPA) for physical addresses provided by the virtual to physical translation cache or the global shared range check 512. If the virtual memory address is part of the global shared range and it is not provided by the local device, then the remote flag is set and instead of getting a host physical address, the HPA to DPA component 516 receives a GURGNID. In these cases, the HPA to DPA component 516 does not convert the HPA to DPA, but rather passes on the GURGNID.

Figure 6:
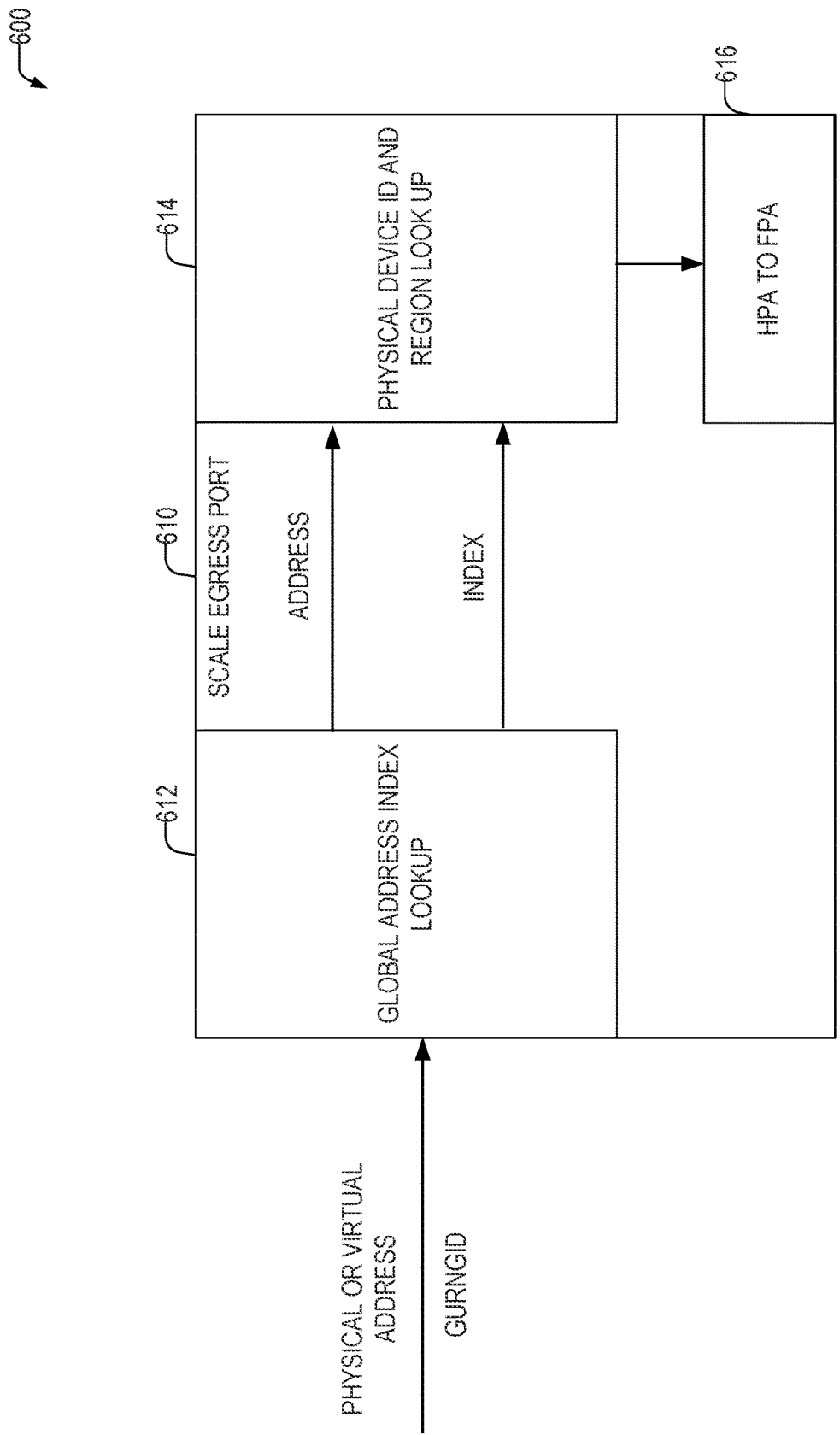
FIG. 6 illustrates a logical diagram of a mapping of a virtual device ID to a physical address in two phases according to some examples of the present disclosure.

A request to a virtual address that is mapped to a remote device (bypassing the local translation cache) is routed to a scale egress port component 610 where the destination device and device physical address are determined. In some examples, to improve scalability, the full physical address for remote accesses is not needed until the request leaves the device. By placing these tables in the egress block, it reduces the number of copies of this information. It is not needed at each requesting block when a device has multiple requesters. This arrangement makes the overall scheme more scalable. FIG. 6 illustrates a diagram of a scale egress port component 610 for mapping of a virtual device ID to a physical address in two phases according to some examples of the present disclosure. As shown in FIG. 6, the physical or virtual address along with the GURGNID is passed to a global address index lookup component 612 of a scale egress component 610. The GURGNID is an index to a scale egress global range table maintained by the global address index lookup component 612. The global address index lookup component 612 uses the GURGNID to find the relevant entry in the scale egress global range table. In some examples, the table has entries containing:

| Register | Bits | Field | Descriptions |
|---|---|---|---|
| ID_MAP_OFFSET | 9:0 | Base | The base address for this GURGNID's region in the Device ID mapping table. This is added to the Virtual Device ID to determine the entry. |
| | 62:10 | Rsrvd | |
| | 63 | Valid | |
| Region Size | 5:0 | Size W | Global Region Valid Region Segment Size Width. Valid values are between 20 (1 MiB) and 40 (1 TiB) |
| | 63:6 | Rsrvd | Reserved, set to zero. |

The virtual device id is added to the Base field in the table entry to create another index. This second index is used to index into a scale egress global device ID map. This second index, as well as the address is passed to the physical device ID and region lookup component 614. The physical device ID and region lookup component 614 uses the index as an entry to a third table it maintains. In some examples, each entry in this third table may include the following fields.

| Register | Bits | Field | Description |
|---|---|---|---|
| Device_ID | 19:0 | Dest_Phys_Seg | The physical segment number for this segment on the destination device. The bits corresponding to the segment offset bits or physical device ID bits are zeroed. |
| | 31:20 | DEST_DID | The physical device ID that hosts this memory. |

The physical address is created by the physical device ID and region lookup component 614 from the dest_phys_segment, dest_did, and an offset within the virtual address. The sizeW from the global range table is used to shift the dest_phys_segment and destination DID up (e.g., at least 20 bits) and to mask the upper bits of the virtual address. The W indicates that this field specifies the bit width of the segment and the value can be used to shift the device ID bits in an address to bit zero. The masked virtual address and the shifted bits are then combined with a logical OR operation. In some examples, the DEST_DID comprises the upper most bits. The physical address is passed to a HPA to FPA 616 which converts the host physical address to a fabric physical address (FPA) and determines routing information for routing the physical address to the proper destination device. The memory access is then routed to the destination device and the memory access is completed.

The disclosed methods and systems may significantly reduce address translation cache performance issues for large virtually segmented address spaces in systems that support shared, partitioned physical address spaces. The disclosed methods, systems, and devices removes hard coded fields from the virtual address to remove constraints on an OS allocating virtual memory. The disclosed methods and systems may be performed by a memory management unit (MMU), which may be logic within one or more processing units shown in FIGS. 1-3 or FIG. 8.

Figure 7:
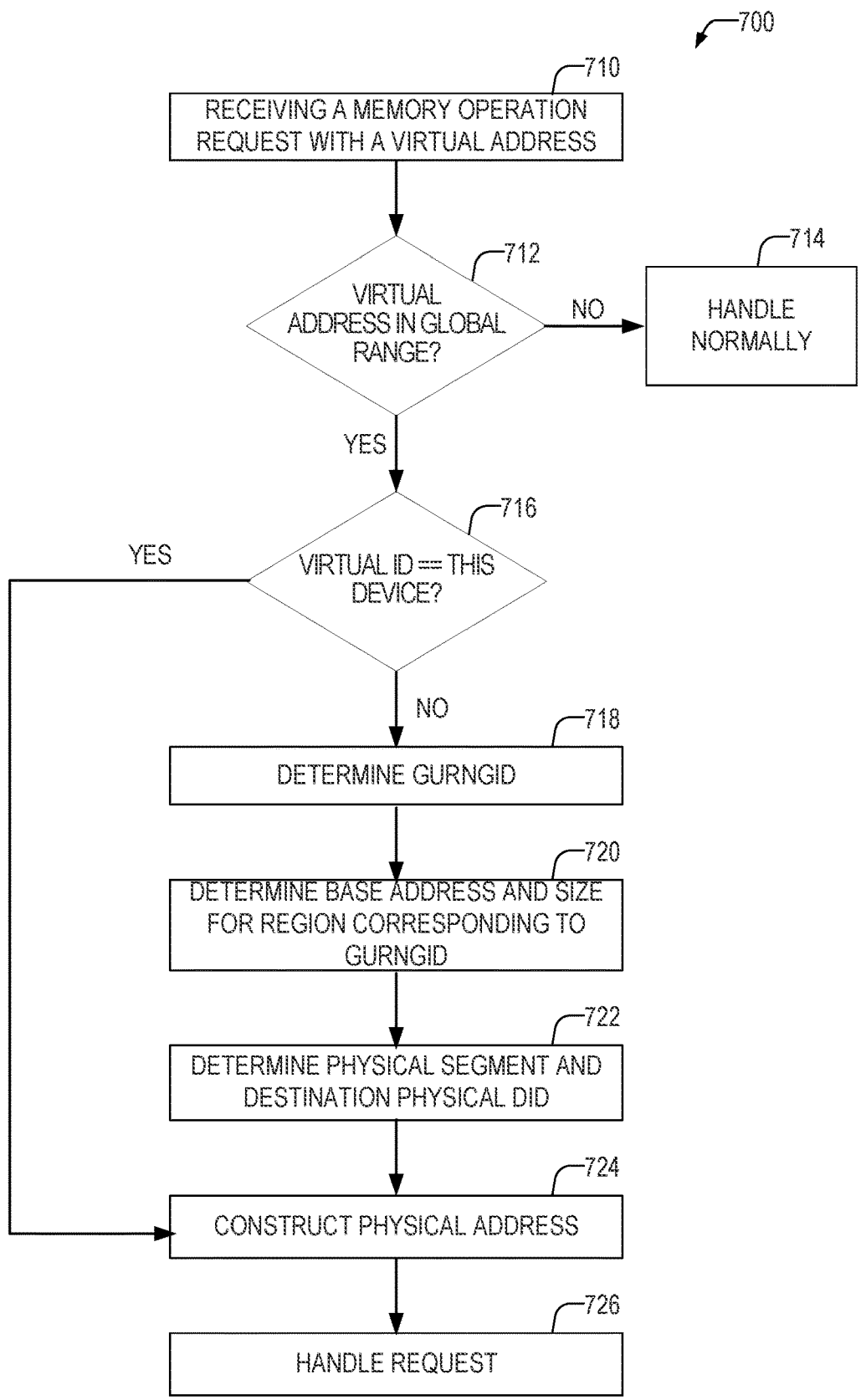
FIG. 7 illustrates a flowchart of a method of servicing a memory request according to some examples of the present disclosure.

FIG. 7 illustrates a flowchart of a method 700 of servicing a memory request according to some examples of the present disclosure. At operation 710 the system may receive a memory operation request (e.g., read, store, and the like). The operation request may include a virtual address that maps to a physical address of the memory where the operation is to be performed. At operation 712, the system determines whether the virtual address is in a global shared virtual address space within a global memory range. For example, by comparing the virtual address to entries of a first table until either an entry in the table is found where the virtual address is between a range specified by the table entry (e.g., by base address and size values) or until all entries have been checked. If all entries are checked and the virtual address is not within any range of any entries, then the virtual address is not in a shared global range and at operation 714, the memory operation may be handled normally (e.g., using a TLB).

If the virtual memory address is within a shared global virtual address range, then at operation 716 the system determines whether the shared global virtual address maps to physical memory within the current device, or whether the global virtual address maps to physical memory within a different device. In some examples, this may be done by utilizing values from the matching entry in the first table. The matching entry may include a shift value and a mask value that may be used to determine a virtual device id. This virtual device id from the virtual address is compared with the virtual id of the current device (which may also be stored in the table entry). If they match, then the memory is local global shared memory. In these examples, then at operation 724, the entry from the first table includes a physical page address that is used along with the virtual address to generate a physical address.

If they do not match, then the physical memory is located in a different device. At operation 718, the system may determine the global unique region ID (e.g., the GURGNID) from the entry in the first table. At operation 720, the system may determine a base address and size for the region corresponding to the GURGNID. For example, the GURGNID may be used as an index into a second table to find a second table entry. The second table entry may have a base address and size. At operation 722, the system may determine a physical segment and destination physical device ID. The system may utilize the base address and the virtual device ID to index into a third table, the third table entry storing the destination physical segment and destination physical device ID.

At operation 724, the system may construct the physical address. The physical address may be created from the dest_phys_segment, dest_did, and an offset within the virtual address. The sizeW from the global range table is used to shift the dest_phys_segment and destination DID up (e.g., at least 20 bits) and to mask the upper bits of the virtual address; The masked virtual address and the shifted bits are then combined with a logical OR operation. In some examples, the DEST_DID comprises the upper most bits. The physical address is passed to a HPA to FPA 616 which determines routing information for routing the physical address to the proper destination device. The memory access is then routed to the destination device and the memory access is completed at operation 726.

Figure 8:
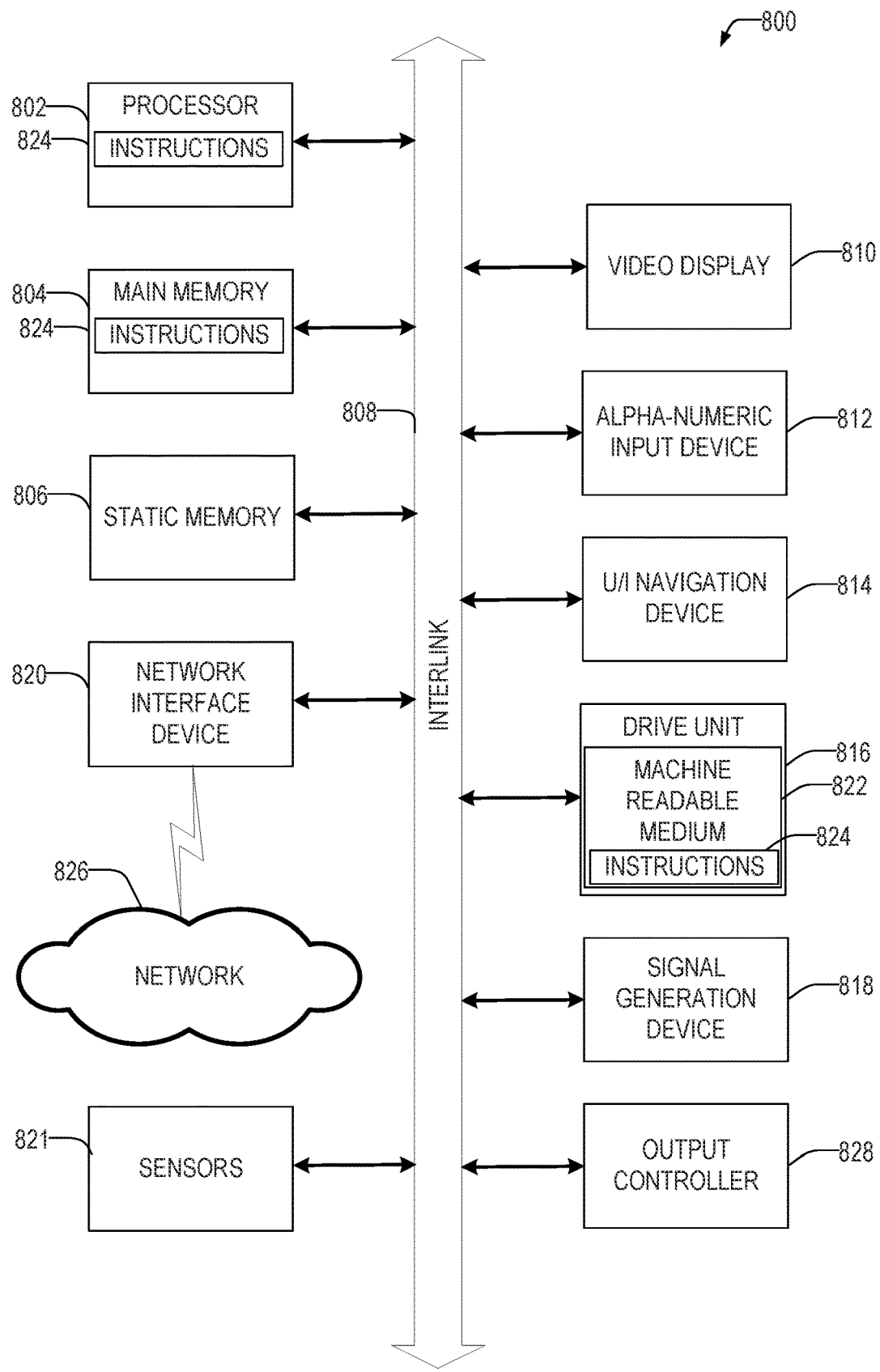
FIG. 8 illustrates a block diagram of an example machine upon which any one or more of the techniques (e.g., methodologies) discussed herein may be performed.

FIG. 8 illustrates a block diagram of an example machine 800 upon which any one or more of the techniques (e.g., methodologies) discussed herein may be performed. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be in the form of a compute-near-memory device (e.g., CXL device), a host, a switch, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. In some examples machine 800 may be, include, or implement the host device 102, memory system 104, second memory device 120, host device 202, CXL device 204, device memory 226, scale switches 321, node switch 318, 320, CXL devices 322-352, host devices 310, 312, 314, 316, implement the logic 500, 600, implement the memory layouts of FIG. 4, and/or the methods of FIG. 7.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 800 may include one or more hardware processors, such as processor 802. Processor 802 may be a central processing unit (CPU), a graphics processing unit (GPU), a hardware processor core, or any combination thereof. Machine 800 may include a main memory 804 and a static memory 806, some or all of which may communicate with each other via an interlink (e.g., bus) 808. Examples of main memory 804 may include Synchronous Dynamic Random-Access Memory (SDRAM), such as Double Data Rate memory, such as DDR4 or DDR5. Interlink 808 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

OTHER NOTES AND EXAMPLES

Example 1 is a method comprising: at a memory management unit (MMU) of a multi-processor, compute-near-memory system, performing operations comprising: receiving a request for a virtual address from a process executing on a processor of the compute-near-memory system; determining that the virtual address is within a global shared virtual address space; responsive to determining that the virtual address is within the global shared virtual address space: determining that a virtual device ID corresponding to the virtual address does not match a local virtual device ID of a device corresponding to the MMU; responsive to determining that the virtual device ID corresponding to the virtual address does not match the local virtual device ID of the device corresponding to the MMU: determining a globally unique range ID based upon the virtual address; determining a base address and size for a region corresponding to the globally unique range ID; determining a destination physical segment and destination physical device identifier using the base address and the virtual device ID; constructing a physical address using the destination physical segment, the destination physical device identifier, size, and a portion of the virtual address; and routing the request for the virtual address based upon the physical address, the physical address belonging to part of a single global physical address space of the compute system.

In Example 2, the subject matter of Example 1 includes, wherein the compute-near-memory system comprises a plurality of hosts connected using at least one switch, the plurality of hosts comprising a plurality of compute devices coupled to the host over a local communication bus, the plurality of compute devices each comprising one or more processors and one or more memory devices.

In Example 3, the subject matter of Examples 1-2 includes, wherein the operations of determining that the virtual address is within the global shared virtual address space comprises determining that the virtual address is within a memory region defined by a base address and a size in an entry of a plurality of entries of a global shared region data structure, each entry of the plurality of entries describing a virtual address space of a different global virtual memory address space.

In Example 4, the subject matter of Example 3 includes, wherein the operations of determining the virtual device ID corresponding to the virtual address comprises shifting the virtual address a number of bits specified in the entry of the plurality of entries of the global shared region data structure and applying a mask specified in the entry of the plurality of entries of the global shared region data structure to produce the virtual device ID corresponding to the virtual address.

In Example 5, the subject matter of Examples 3-4 includes, wherein the operations of determining the globally unique range ID comprises reading the globally unique range ID from the entry of the plurality of entries of the global shared region data structure.

In Example 6, the subject matter of Examples 1-5 includes, wherein determining the base address for the region corresponding to the globally unique range ID comprises utilizing the globally unique range ID as an index to determining an entry of a global range information table, the entry including the base address; and wherein determining a size of the region corresponding to the globally unique range ID comprises reading the size from the entry.

In Example 7, the subject matter of Examples 1-6 includes, wherein determining the physical address using the destination physical segment, the destination physical device identifier, and the portion of the virtual address comprises shifting the destination physical device identifier and the destination physical segment by the size of the region and ORing the virtual address masked with a mask created to mask the corresponding bit positions of the shifted destination physical device identifier and destination physical segment.

In Example 8, the subject matter of Examples 1-7 includes, wherein the operations further comprise: receiving a second request for a second virtual address from the process executing on the processor of the compute-near-memory system; determining that the second virtual address is not within the global shared virtual address space; and responsive to determining that the second virtual address is not within the global shared virtual address space converting the second virtual address to a second physical address using a translation look aside buffer.

In Example 9, the subject matter of Example 8 includes, wherein a hit percentage of the translation look aside buffer is increased by virtue of a lack of virtual address entries of the global shared virtual address space within the translation look aside buffer.

In Example 10, the subject matter of Examples 1-9 includes, wherein the operations further comprise: receiving a second request for a second virtual address from the process executing on the processor of the compute-near-memory system; determining that the second virtual address is within the global shared virtual address space by matching the second virtual address to a record of a global shared region table; responsive to determining that the second virtual address is within the global shared virtual address space: determining a second virtual device ID corresponding to the second virtual address based upon the record of the global shared region table; determining that the second virtual device ID corresponding to the second virtual address matches the local virtual device ID of the device corresponding to the MMU; and responsive to determining that the virtual device ID corresponding to the second virtual address matches the local virtual device ID of a device corresponding to the MMU, determining a second physical address of the second virtual address using the record of the global shared region table.

Example 11 is a computing device of a compute-near-memory system, the computing device comprising: a memory management unit (MMU) configured to perform the operations comprising: receiving a request for a virtual address from a process executing on a processor of the compute-near-memory system; determining that the virtual address is within a global shared virtual address space; responsive to determining that the virtual address is within the global shared virtual address space: determining that a virtual device ID corresponding to the virtual address does not match a local virtual device ID of a device corresponding to the MMU; responsive to determining that the virtual device ID corresponding to the virtual address does not match the local virtual device ID of the device corresponding to the MMU: determining a globally unique range ID based upon the virtual address; determining a base address and size for a region corresponding to the globally unique range ID; determining a destination physical segment and destination physical device identifier using the base address and the virtual device ID; constructing a physical address using the destination physical segment, the destination physical device identifier, size, and a portion of the virtual address; and routing the request for the virtual address based upon the physical address, the physical address belonging to part of a single global physical address space of the compute system.

In Example 12, the subject matter of Example 11 includes, wherein the compute-near-memory system comprises a plurality of hosts connected using at least one switch, the plurality of hosts comprising a plurality of compute devices coupled to the host over a local communication bus, the plurality of compute devices each comprising one or more processors and one or more memory devices.

In Example 13, the subject matter of Examples 11-12 includes, wherein the operations of determining that the virtual address is within the global shared virtual address space comprises determining that the virtual address is within a memory region defined by a base address and a size in an entry of a plurality of entries of a global shared region data structure, each entry of the plurality of entries describing a virtual address space of a different global virtual memory address space.

In Example 14, the subject matter of Example 13 includes, wherein the operations of determining the virtual device ID corresponding to the virtual address comprises shifting the virtual address a number of bits specified in the entry of the plurality of entries of the global shared region data structure and applying a mask specified in the entry of the plurality of entries of the global shared region data structure to produce the virtual device ID corresponding to the virtual address.

In Example 15, the subject matter of Examples 13-14 includes, wherein the operations of determining the globally unique range ID comprises reading the globally unique range ID from the entry of the plurality of entries of the global shared region data structure.

In Example 16, the subject matter of Examples 11-15 includes, wherein determining the base address for the region corresponding to the globally unique range ID comprises utilizing the globally unique range ID as an index to determining an entry of a global range information table, the entry including the base address; and wherein determining a size of the region corresponding to the globally unique range ID comprises reading the size from the entry.

In Example 17, the subject matter of Examples 11-16 includes, wherein determining the physical address using the destination physical segment, the destination physical device identifier, and the portion of the virtual address comprises shifting the destination physical device identifier and the destination physical segment by the size of the region and ORing the virtual address masked with a mask created to mask the corresponding bit positions of the shifted destination physical device identifier and destination physical segment.

In Example 18, the subject matter of Examples 11-17 includes, wherein the operations further comprise: receiving a second request for a second virtual address from the process executing on the processor of the compute-near-memory system; determining that the second virtual address is not within the global shared virtual address space; and responsive to determining that the second virtual address is not within the global shared virtual address space converting the second virtual address to a second physical address using a translation look aside buffer.

In Example 19, the subject matter of Example 18 includes, wherein a hit percentage of the translation look aside buffer is increased by virtue of a lack of virtual address entries of the global shared virtual address space within the translation look aside buffer.

In Example 20, the subject matter of Examples 11-19 includes, wherein the operations further comprise: receiving a second request for a second virtual address from the process executing on the processor of the compute-near-memory system; determining that the second virtual address is within the global shared virtual address space by matching the second virtual address to a record of a global shared region table; responsive to determining that the second virtual address is within the global shared virtual address space: determining a second virtual device ID corresponding to the second virtual address based upon the record of the global shared region table; determining that the second virtual device ID corresponding to the second virtual address matches the local virtual device ID of the device corresponding to the MMU; and responsive to determining that the virtual device ID corresponding to the second virtual address matches the local virtual device ID of a device corresponding to the MMU, determining a second physical address of the second virtual address using the record of the global shared region table.

Example 21 is a non-transitory computer-readable medium, storing instructions, which when executed by a memory management unit (MMU) of a computing device of a compute-near-memory system, causes the computing device to perform operations comprising: receiving a request for a virtual address from a process executing on a processor of the compute-near-memory system; determining that the virtual address is within a global shared virtual address space; responsive to determining that the virtual address is within the global shared virtual address space: determining that a virtual device ID corresponding to the virtual address does not match a local virtual device ID of a device corresponding to the MMU; responsive to determining that the virtual device ID corresponding to the virtual address does not match the local virtual device ID of the device corresponding to the MMU: determining a globally unique range ID based upon the virtual address; determining a base address and size for a region corresponding to the globally unique range ID; determining a destination physical segment and destination physical device identifier using the base address and the virtual device ID; constructing a physical address using the destination physical segment, the destination physical device identifier, size, and a portion of the virtual address; and routing the request for the virtual address based upon the physical address, the physical address belonging to part of a single global physical address space of the compute system.

In Example 22, the subject matter of Example 21 includes, wherein the compute-near-memory system comprises a plurality of hosts connected using at least one switch, the plurality of hosts comprising a plurality of compute devices coupled to the host over a local communication bus, the plurality of compute devices each comprising one or more processors and one or more memory devices.

In Example 23, the subject matter of Examples 21-22 includes, wherein the operations of determining that the virtual address is within the global shared virtual address space comprises determining that the virtual address is within a memory region defined by a base address and a size in an entry of a plurality of entries of a global shared region data structure, each entry of the plurality of entries describing a virtual address space of a different global virtual memory address space.

In Example 24, the subject matter of Example 23 includes, wherein the operations of determining the virtual device ID corresponding to the virtual address comprises shifting the virtual address a number of bits specified in the entry of the plurality of entries of the global shared region data structure and applying a mask specified in the entry of the plurality of entries of the global shared region data structure to produce the virtual device ID corresponding to the virtual address.

In Example 25, the subject matter of Examples 23-24 includes, wherein the operations of determining the globally unique range ID comprises reading the globally unique range ID from the entry of the plurality of entries of the global shared region data structure.

In Example 26, the subject matter of Examples 21-25 includes, wherein determining the base address for the region corresponding to the globally unique range ID comprises utilizing the globally unique range ID as an index to determining an entry of a global range information table, the entry including the base address; and wherein determining a size of the region corresponding to the globally unique range ID comprises reading the size from the entry.

In Example 27, the subject matter of Examples 21-26 includes, wherein determining the physical address using the destination physical segment, the destination physical device identifier, and the portion of the virtual address comprises shifting the destination physical device identifier and the destination physical segment by the size of the region and ORing the virtual address masked with a mask created to mask the corresponding bit positions of the shifted destination physical device identifier and destination physical segment.

In Example 28, the subject matter of Examples 21-27 includes, wherein the operations further comprise: receiving a second request for a second virtual address from the process executing on the processor of the compute-near-memory system; determining that the second virtual address is not within the global shared virtual address space; and responsive to determining that the second virtual address is not within the global shared virtual address space converting the second virtual address to a second physical address using a translation look aside buffer.

In Example 29, the subject matter of Example 28 includes, wherein a hit percentage of the translation look aside buffer is increased by virtue of a lack of virtual address entries of the global shared virtual address space within the translation look aside buffer.

In Example 30, the subject matter of Examples 21-29 includes, wherein the operations further comprise: receiving a second request for a second virtual address from the process executing on the processor of the compute-near-memory system; determining that the second virtual address is within the global shared virtual address space by matching the second virtual address to a record of a global shared region table; responsive to determining that the second virtual address is within the global shared virtual address space: determining a second virtual device ID corresponding to the second virtual address based upon the record of the global shared region table; determining that the second virtual device ID corresponding to the second virtual address matches the local virtual device ID of the device corresponding to the MMU; and responsive to determining that the virtual device ID corresponding to the second virtual address matches the local virtual device ID of a device corresponding to the MMU, determining a second physical address of the second virtual address using the record of the global shared region table.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

What is claimed is:

1. A method comprising:
at a memory management unit (MMU) of a multi-processor, compute-near-memory system, performing operations comprising:
receiving a request for a virtual address from a process executing on a processor of the compute-near-memory system;
determining that the virtual address is within a global shared virtual address space;
responsive to determining that the virtual address is within the global shared virtual address space:
determining that a virtual device ID corresponding to the virtual address does not match a local virtual device ID of a device corresponding to the MMU;
responsive to determining that the virtual device ID corresponding to the virtual address does not match the local virtual device ID of the device corresponding to the MMU:
determining a globally unique range ID based upon the virtual address;
determining a base address and size for a region corresponding to the globally unique range ID;
determining a destination physical segment and destination physical device identifier using the base address and the virtual device ID;
constructing a physical address using the destination physical segment, the destination physical device identifier, size, and a portion of the virtual address; and
routing the request for the virtual address based upon the physical address, the physical address belonging to part of a single global physical address space of the compute system.

2. The method of claim 1, wherein the compute-near-memory system comprises a plurality of hosts connected using at least one switch, the plurality of hosts comprising a plurality of compute devices coupled to the host over a local communication bus, the plurality of compute devices each comprising one or more processors and one or more memory devices.

3. The method of claim 1, wherein the operations of determining that the virtual address is within the global shared virtual address space comprises determining that the virtual address is within a memory region defined by a base address and a size in an entry of a plurality of entries of a global shared region data structure, each entry of the plurality of entries describing a virtual address space of a different global virtual memory address space.

4. The method of claim 3, wherein the operations of determining the virtual device ID corresponding to the virtual address comprises shifting the virtual address a number of bits specified in the entry of the plurality of entries of the global shared region data structure and applying a mask specified in the entry of the plurality of entries of the global shared region data structure to produce the virtual device ID corresponding to the virtual address.

5. The method of claim 3, wherein the operations of determining the globally unique range ID comprises reading the globally unique range ID from the entry of the plurality of entries of the global shared region data structure.

6. A computing device of a compute-near-memory system, the computing device comprising:
a memory management unit (MMU) configured to perform the operations comprising:
receiving a request for a virtual address from a process executing on a processor of the compute-near-memory system;
determining that the virtual address is within a global shared virtual address space;
responsive to determining that the virtual address is within the global shared virtual address space:
determining that a virtual device ID corresponding to the virtual address does not match a local virtual device ID of a device corresponding to the MMU;
responsive to determining that the virtual device ID corresponding to the virtual address does not match the local virtual device ID of the device corresponding to the MMU:
determining a globally unique range ID based upon the virtual address;
determining a base address and size for a region corresponding to the globally unique range ID;
determining a destination physical segment and destination physical device identifier using the base address and the virtual device ID;
constructing a physical address using the destination physical segment, the destination physical device identifier, size, and a portion of the virtual address; and
routing the request for the virtual address based upon the physical address, the physical address belonging to part of a single global physical address space of the compute system.

7. The computing device of claim 6, wherein the compute-near-memory system comprises a plurality of hosts connected using at least one switch, the plurality of hosts comprising a plurality of compute devices coupled to the host over a local communication bus, the plurality of compute devices each comprising one or more processors and one or more memory devices.

8. The computing device of claim 6, wherein the operations of determining that the virtual address is within the global shared virtual address space comprises determining that the virtual address is within a memory region defined by a base address and a size in an entry of a plurality of entries of a global shared region data structure, each entry of the plurality of entries describing a virtual address space of a different global virtual memory address space.

9. The computing device of claim 8, wherein the operations of determining the virtual device ID corresponding to the virtual address comprises shifting the virtual address a number of bits specified in the entry of the plurality of entries of the global shared region data structure and applying a mask specified in the entry of the plurality of entries of the global shared region data structure to produce the virtual device ID corresponding to the virtual address.

10. The computing device of claim 8, wherein the operations of determining the globally unique range ID comprises reading the globally unique range ID from the entry of the plurality of entries of the global shared region data structure.

11. The computing device of claim 6, wherein determining the base address for the region corresponding to the globally unique range ID comprises utilizing the globally unique range ID as an index to determining an entry of a global range information table, the entry including the base address; and
wherein determining a size of the region corresponding to the globally unique range ID comprises reading the size from the entry.

12. The computing device of claim 6, wherein determining the physical address using the destination physical segment, the destination physical device identifier, and the portion of the virtual address comprises shifting the destination physical device identifier and the destination physical segment by the size of the region and ORing the virtual address masked with a mask created to mask the corresponding bit positions of the shifted destination physical device identifier and destination physical segment.

13. The computing device of claim 6, wherein the operations further comprise:
  receiving a second request for a second virtual address from the process executing on the processor of the compute-near-memory system;
  determining that the second virtual address is not within the global shared virtual address space; and
  responsive to determining that the second virtual address is not within the global shared virtual address space converting the second virtual address to a second physical address using a translation look aside buffer.

14. The computing device of claim 6, wherein the operations further comprise:
  receiving a second request for a second virtual address from the process executing on the processor of the compute-near-memory system;
  determining that the second virtual address is within the global shared virtual address space by matching the second virtual address to a record of a global shared region table;
  responsive to determining that the second virtual address is within the global shared virtual address space:
  determining a second virtual device ID corresponding to the second virtual address based upon the record of the global shared region table;
  determining that the second virtual device ID corresponding to the second virtual address matches the local virtual device ID of the device corresponding to the MMU; and
  responsive to determining that the virtual device ID corresponding to the second virtual address matches the local virtual device ID of a device corresponding to the MMU, determining a second physical address of the second virtual address using the record of the global shared region table.

15. A non-transitory computer-readable medium, storing instructions, which when executed by a memory management unit (MMU) of a computing device of a compute-near-memory system, causes the computing device to perform operations comprising:
  receiving a request for a virtual address from a process executing on a processor of the compute-near-memory system;
  determining that the virtual address is within a global shared virtual address space;
  responsive to determining that the virtual address is within the global shared virtual address space:
  determining that a virtual device ID corresponding to the virtual address does not match a local virtual device ID of a device corresponding to the MMU;
  responsive to determining that the virtual device ID corresponding to the virtual address does not match the local virtual device ID of the device corresponding to the MMU:
  determining a globally unique range ID based upon the virtual address;
  determining a base address and size for a region corresponding to the globally unique range ID;
  determining a destination physical segment and destination physical device identifier using the base address and the virtual device ID;
  constructing a physical address using the destination physical segment, the destination physical device identifier, size, and a portion of the virtual address; and
  routing the request for the virtual address based upon the physical address, the physical address belonging to part of a single global physical address space of the compute system.

16. The non-transitory computer-readable medium of claim 15, wherein determining the base address for the region corresponding to the globally unique range ID comprises utilizing the globally unique range ID as an index to determining an entry of a global range information table, the entry including the base address; and
  wherein determining a size of the region corresponding to the globally unique range ID comprises reading the size from the entry.

17. The non-transitory computer-readable medium of claim 15, wherein determining the physical address using the destination physical segment, the destination physical device identifier, and the portion of the virtual address comprises shifting the destination physical device identifier and the destination physical segment by the size of the region and ORing the virtual address masked with a mask created to mask the corresponding bit positions of the shifted destination physical device identifier and destination physical segment.

18. The non-transitory computer-readable medium of claim 15, wherein the operations further comprise:
  receiving a second request for a second virtual address from the process executing on the processor of the compute-near-memory system;
  determining that the second virtual address is not within the global shared virtual address space; and
  responsive to determining that the second virtual address is not within the global shared virtual address space converting the second virtual address to a second physical address using a translation look aside buffer.

* * * * *